No. 841,053. PATENTED JAN. 8, 1907.
C. ROUSE.
SUPPORT FOR CONVEYER BELTS.
APPLICATION FILED MAR. 22, 1905.

Witnesses
J. Mason Manspun
J. Mae Wright

Inventor
Charles Rouse
by David Moore.
Attorney

UNITED STATES PATENT OFFICE.

CHARLES ROUSE, OF PITTSBURG, PENNSYLVANIA.

SUPPORT FOR CONVEYER-BELTS.

No. 841,053.   Specification of Letters Patent.   Patented Jan. 8, 1907.

Application filed March 22, 1905. Serial No. 251,374.

*To all whom it may concern:*

Be it known that I, CHARLES ROUSE, a citizen of the United States, residing at Pittsburg, in the county of Allegheny and State of Pennsylvania, have invented a new and useful Improvement in Supports for Conveyer-Belts, of which the following is a specification.

My present invention relates to improvements in supports for conveyer-belts; and the main object is to provide a means whereby a series of pulleys are so journaled as to properly allow the conveyer-belt to pass thereover and at the same time bend or curve the surface of the conveyer-belt so as to prevent the same from creasing and ultimately cracking at the abutting ends of the rollers, as well as to prevent articles from passing over the edges thereof.

To attain these objects, my invention consists of a rolling support for conveyer-belts embodying novel features of construction and combination of parts, substantially as described herein.

Figure 1:
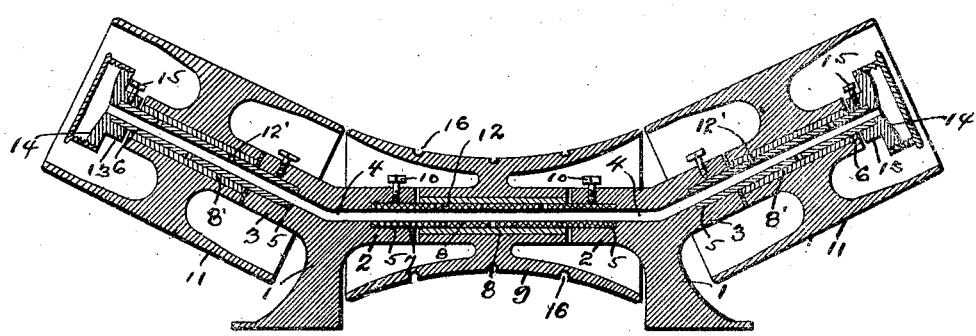
Figure 2:
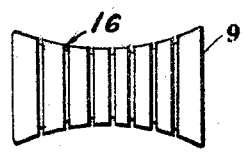
Figure 3:
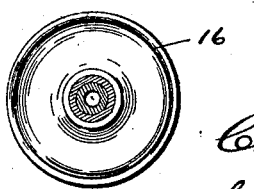

In the accompanying drawings, Figure 1 is a horizontal sectional view taken through the support, showing my construction, in which three pulleys are employed. Fig. 2 is an end view of the central roller, shown in Fig. 1. Fig. 3 is an enlarged detail view setting forth the grooves 16.

Referring to the drawings, the numeral 1 designates the two brackets, which are arranged in pairs and so disposed that the inner projections 2 oppose each other, while the outer upwardly-inclined projections 3 extend outward in opposite directions.

The bore 4 is formed in these projections, terminating in the enlarged portions 5 for the reception of the tubular shafts 6 and 7, the shaft 7 connecting the brackets together and having mounted thereon a bushing or bearing 8 for the reception of the roller or pulley 9. Set-screws 10 are employed to hold the shafts 6 and 7 in place. In order to properly oil the rollers 9 and 11, the bushing 8 and 8' are provided with openings 12 and 12', as clearly shown in Fig. 1. The pulleys 11 are rotatably mounted upon the bushings 8' and are secured in place by means of the shoulder 13, carried by the grease-cups 14, which are secured to the outer end of the bushing 8' by means of the set-screws 15.

The surface of the roller or pulley 9 is concaved longitudinally, as clearly shown in the drawings, and, as shown in Fig. 3, may be provided with a series of circumferential grooves 16, as clearly shown in Fig. 4, thus providing a surface whereby the conveyer-belt is readily engaged and moved along the pulleys 11, simply providing a means whereby the outer edges of the belt are turned upward to cause the same to be concaved in cross-section. The construction herein described is clearly shown in Figs. 1 and 3 of the drawings.

From the foregoing description, taken in connection with the drawings, it is evident that I provide a novel construction of belt-conveyer support.

What I claim as new, and desire to secure by Letters Patent, is—

1. A support for a conveyer-belt, comprising a plurality of rollers, the central one of which is mounted on a horizontal plane and having a concaved periphery with circumferential grooves, while the outer rollers are angularly arranged so that their supporting-surface will conform to the natural curvature of the belt.

2. A support for a conveyer-belt, comprising two brackets, a journal connecting the brackets and one secured to the opposite side of each bracket and projecting outwardly, a roller provided with a concaved surface with circumferential grooves mounted upon the connecting-journal and two rollers one each, mounted upon the outwardly-projecting journals in such position that their surfaces conform to the natural curvature of the belt.

3. A support for conveyer-belts, comprising a plurality of rollers, the center one of which is concaved and provided with circumferential means for assisting in the engaging of the belt during its travel thereover.

In testimony whereof I have signed my name to this specification in the presence of two subscribing witnesses.

CHARLES ROUSE.

Witnesses:
 J. A. RENNIE,
 J. MAE WRIGHT.